United States Patent
Schaefer

(10) Patent No.: US 7,227,882 B2
(45) Date of Patent: Jun. 5, 2007

(54) SYSTEM AND METHOD OF PROCESSING ELECTRIC ARC FURNACE DUST

(75) Inventor: Frederick Anthony Schaefer, Colorado Springs, CO (US)

(73) Assignee: Edw. C. Levy Co., Detroit, MI (US)

( * ) Notice: Subject to any disclaimer, the term of this patent is extended or adjusted under 35 U.S.C. 154(b) by 161 days.

(21) Appl. No.: 10/950,260

(22) Filed: Sep. 24, 2004

(65) Prior Publication Data
US 2005/0083988 A1    Apr. 21, 2005

Related U.S. Application Data

(60) Provisional application No. 60/524,826, filed on Nov. 25, 2003, provisional application No. 60/512,895, filed on Oct. 21, 2003.

(51) Int. Cl.
*H05B 11/00* (2006.01)
(52) U.S. Cl. .................. 373/1; 373/8; 75/479; 208/132
(58) Field of Classification Search .................. 373/1, 373/2, 8–10; 219/678–684; 75/10.63, 770, 75/658, 479, 484; 208/132; 241/29; 110/346; 106/756
See application file for complete search history.

(56) References Cited

U.S. PATENT DOCUMENTS

| 5,046,435 A * | 9/1991 | Kugler ..................... 110/346 |
| 5,421,880 A * | 6/1995 | Young ..................... 106/756 |
| 5,906,671 A * | 5/1999 | Weinwurm et al. .......... 75/479 |
| 6,722,593 B1 * | 4/2004 | Dobozy ..................... 241/29 |
| 2003/0209469 A1 * | 11/2003 | Kivlen ..................... 208/132 |

FOREIGN PATENT DOCUMENTS

JP    2001330224 A    * 11/2001

* cited by examiner

*Primary Examiner*—Quang Van
(74) *Attorney, Agent, or Firm*—Honigman Miller Schwartz & Cohn LLP

(57) ABSTRACT

A method of processing electric arc furnace dust includes the steps of preheating a portion of electric arc furnace dust to a temperature of at least 170 degrees centigrade by convection heating to form a preheated dust. The preheated dust is further heated by microwaves until a zinc in the preheat dust vaporizes to form a metal vapor and a residue. The metal vapor is then condensed.

18 Claims, 9 Drawing Sheets

SYSTEM AND METHOD OF PROCESSING ELECTRIC ARC FURNACE DUST

RELATED APPLICATIONS

The present invention claims priority on provisional patent applications, Ser. No. 60/524,826, filed on Nov. 25, 2003, entitled "Continuous Method and Apparatus for Processing Dust with Microwave Energy" and Ser. No. 60/512,895, filed on Oct. 21, 2003, entitled "Method and Apparatus for Processing Electric Arc Furnace Dust (EAF Dust)."

FIELD OF THE INVENTION

The present invention relates generally to the field of steel making processes and more particularly to a system and method of processing electric arc furnace dust.

BACKGROUND OF THE INVENTION

Electric arc furnace (EAF) dust is produced in the steel making process. This dust contains hazardous materials and the dust is collected in a bag house for further processing. The primary hazardous materials in EAF dust are lead, cadmium and hexavalent chromium. Because these constituents leach, most EAF dust from the production of carbon steel is considered hazardous. One solution to this problem has been to process the EAF dust so that it is stabilized and will not leach. The stabilized EAF dust is then placed in a landfill. The cost of transporting this material and landfill cost can be large. A second solution has been to use a pyromettalurgical process that uses a Waelz kiln to heat the dust and fume zinc and other impurities off. Before the EAF dust can be processed it has to be mixed with coke (carbon) and sand. The carbon acts as a reductant and as all or part of the fuel. The sand controls the chemical and physical properties of the slag in the kiln. The mixture has to be heated to very large temperatures 1200–1300 degrees centigrade and the left over slag or residue has the consistency of hot fudge which makes it difficult to work with in various material handling steps. While this process is able to remove most or all the hazardous materials which have commercial value, the energy costs are very large and the process requires a very large capital outlay. The large capital outlay is necessary because the process is only economically viable if it processes a large amount of the EAF dust. As a result, the EAF dust has to be transported to a central location for processing. This increases the cost of the process.

Thus there exists a need for a process that can economically remove the hazardous material and recover the commercially valuable material from EAF dust.

SUMMARY OF INVENTION

A method of processing electric arc furnace dust that overcomes these and other problems includes the steps of preheating a portion of electric arc furnace dust to a temperature of at least 170 degrees centigrade by convection heating to form a preheated dust. The preheated dust is further heated by microwaves until a zinc in the preheat dust vaporizes to form a metal vapor and a residue. The metal vapor is then condensed. The remaining iron rich slag residue is removed from the microwave. The residue is heated to form a molten material. An ingot is formed from the molten material.

In one embodiment, a percentage of zinc in the portion of electric arc furnace dust is determined. The portion of electric arc furnace dust is mixed with a quantity of carbon. The quantity of carbon is determined by the percentage of zinc. The quantity of carbon is proportional to the percentage of zinc. A bulk temperature of the preheated dust may be limited to less than 1200 degrees centigrade. A metal vapor may be swept from the preheated dust using hot air.

In one embodiment, a system for processing electric arc furnace dust has a convection preheating section. A microwave kiln receives a preheated dust from the convection preheating section. A condensation and collection section is coupled to a flue of the microwave kiln. A pug mill processes a residue of the microwave kiln. A residue may be placed in an ingot forming process. A dust mixer mixes a portion of electric arc furnace dust with carbon. A system determines a percentage of zinc in the electric arc furnace dust. The dust mixer may have an algorithm for determining the percentage of carbon required based on the percentage of zinc in the electric arc furnace dust. The microwave kiln may have a temperature sensor and a variable conveyance system coupled to a controller.

In one embodiment a system for processing electric arc furnace dust has a convection preheating oven with a preheating temperature sensor. A microwave kiln receives a preheated dust and has a flue and a temperature sensor. A collector receives the fumes from the flue of the microwave kiln. A mixer mixes an electric arc furnace dust with carbon only to form a mixture that is provided to the convection preheating oven. A pug mill receives a residue from the microwave kiln. The preheating temperature sensor is coupled to a preheating controller that controls a preheating variable rate conveyance system in the convention preheating oven. The temperature sensor is coupled a controller that controls a variable rate conveyance system in the microwave kiln. The conveyance system mixes the preheated dust with air.

DETAILED DESCRIPTION OF THE DRAWINGS

A process and system for processing electric arc furnace (EAF) dust using a convection pre-heater to heat the dust to about 200 degree centigrade. The preheated dust is then heated by microwave energy. Using microwave energy is more efficient than convection heating once the dust is over 170–185 degrees centigrade. The microwave energy selectively heats the carbon mixed with the EAF dust and some components of the EAF dust. As a result, the zinc and lead are vaporized without the temperature of the bulk of the EAF dust having to reach a temperature of 1200–1300 degrees centigrade. As a result, the leftover residue is a powder and not a sludge having the consistency of hot fudge like the prior art system. As a result this system and process requires less energy and makes the residue easier to handle. The system can be made economically viable with much smaller quantities of EAF dust than a Waelz kiln system. In fact these systems can often be collocated with steel producing factories. This eliminates the need for transporting the EAF dust to another facility.

Figure 1:
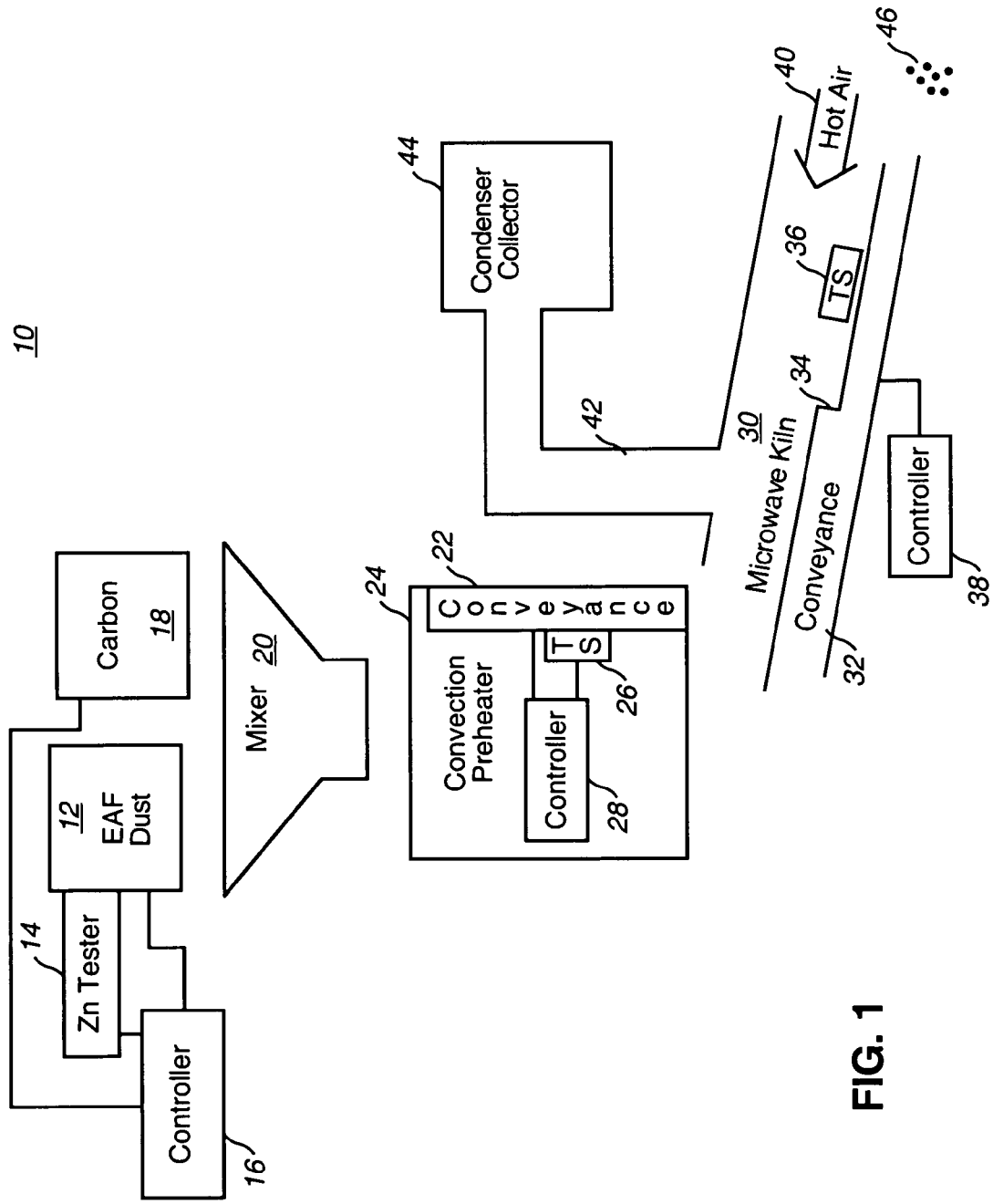
FIG. 1 is a block diagram of a system for processing electric arc furnace dust in accordance with one embodiment of the invention.

FIG. 1 is a block diagram of a system 10 for processing electric arc furnace dust in accordance with one embodiment of the invention. The system 10 has an EAF dust holder 12. A zinc tester 14 tests the amount of zinc in the EAF dust. The zinc testing may be done in a separate laboratory. A controller 16 is coupled to the zinc tester 14 and controls the amount of EAF dust 12 and the amount of carbon (coke) 18 that is put into the mixer 20. The amount of carbon added is between 5% to 30% of the mixture by weight. The mixer 20 thoroughly mixes the carbon in with the EAF dust. The mixture is then placed on a variable speed conveyor 22 in a convection preheating oven 24. A temperature sensor 26 measures the temperature of the mixture and sends this information to a controller 28. The controller 28 controls the speed of the conveyor 22 based on the temperature. The mixture ideally will have a temperature of 170–200 degrees centigrade when it leaves the pre-heater 24 although it may be as low as 100 C and as high as 300 C. At this temperature the dielectric properties of the dust and the carbon are such that they will readily absorb energy from microwaves. Note that the conveyor 22 could be any system for transporting the dust through the convection preheating oven 24. In addition, the controller 28 may control the amount of heat provided by the convection pre-heater 24 rather than control the speed of the conveyor 22. Note that the system does not require sand in the mixture like previous systems.

Once the mixture is preheated it enters a microwave kiln or conveyor furnace 30. The preheated dust is placed on a second conveyor 32 in the microwave kiln 30. Microwaves are applied to the preheated dust which causes the carbon to react with the zinc oxide in the EAF dust to allow the zinc to vaporize or fume. The chemical reactions are:

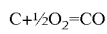

$C + \frac{1}{2} O_2 = CO$

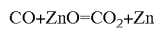

$CO + ZnO = CO_2 + Zn$

Carbon burns in an air atmosphere at between 600 C and 800 C. For this reaction to occur, which produces heat, the carbon must be exposed to air. As a result, the conveyor 32 is shown with a couple of steps 34. The steps 34 provide oxygen to the carbon. The carbon is selectively heated by the microwaves so that the bulk temperature of the mixture never needs to exceed about 1000 C to 1200 C. A temperature sensor 36 measures the temperature of the preheated dust and sends this information to a controller 38. The controller 38 controls the speed of the variable speed conveyor 32. Once the zinc and other metals such as lead vaporize they rise toward the top of the microwave kiln 30. Hot air 40 is introduces at the lower end of the kiln 30 and sweeps the vaporized metals through a flue 42 to a condenser and collector 44 where these metals are trapped. These metals have commercial value and can be sold. The residue 46 has a particulate form and is now free from the hazardous materials. The residue 46 may be used in cement or may be further processed for reuse in a steel manufacturing process. The residue has a high concentration of iron.

Figure 2:
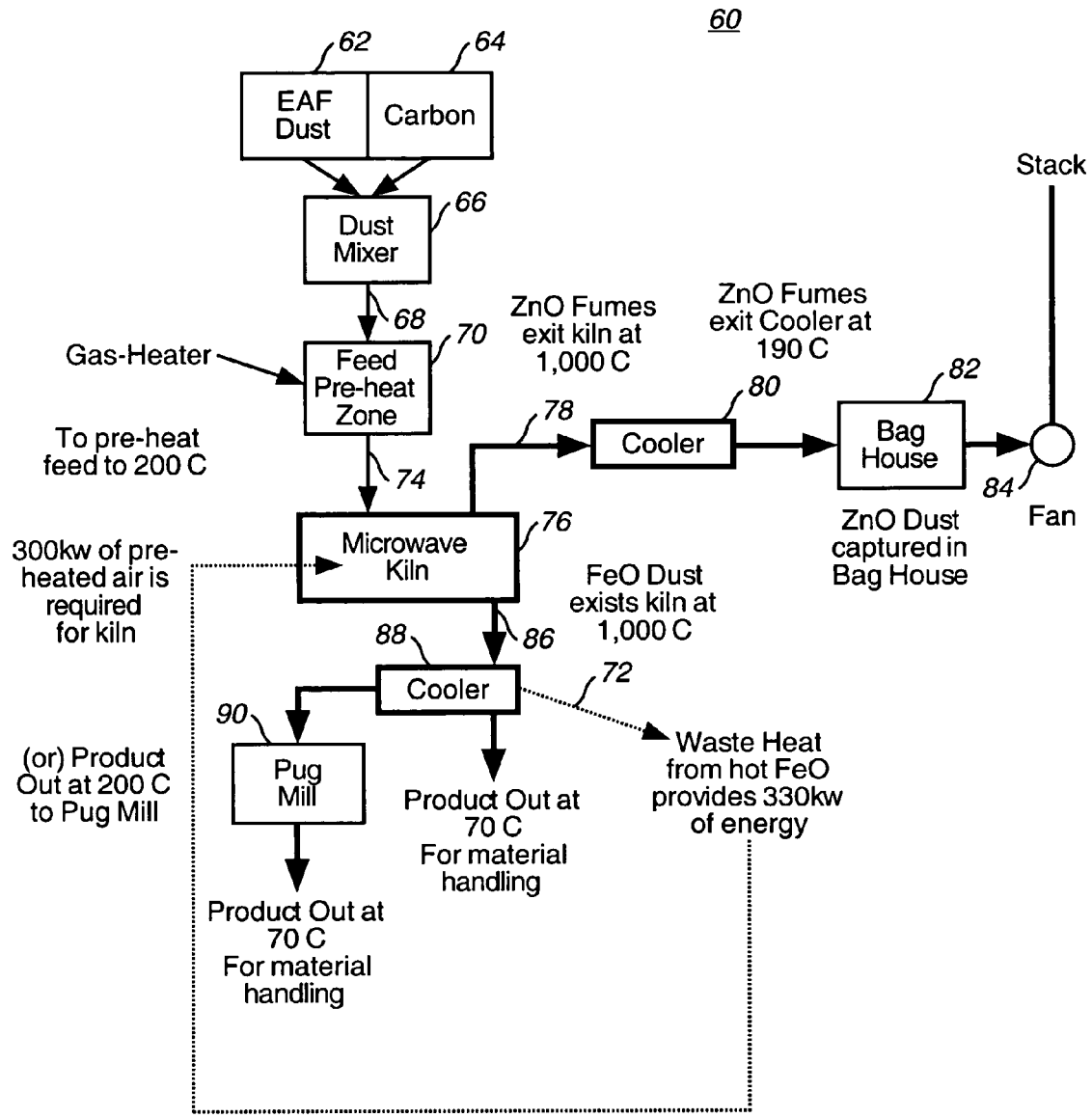
FIG. 2 is a block diagram of a system for processing electric arc furnace dust in accordance with one embodiment of the invention.

FIG. 2 is a block diagram of a system 60 for processing electric arc furnace dust in accordance with one embodiment of the invention. The system 60 is similar to the system 10 shown in FIG. 1. EAF dust 62 and carbon 64 are input into a dust mixer 66. The dust mixture 68 is placed in a convection pre-heater 70. The pre-heater may use a gas heater or may use the waste heat 72 (shown in dashed lines) to preheat the mixture to around 200 C. The preheated dust 74 is placed in a microwave kiln 76. The microwave kiln heats the dust to a temperature of between 1000 C and 1200 C. However, it should be noted that the microwave process is self limiting in temperature. Above 1000 C to 1200 C the dust materials' dielectric properties change and the dust no longer efficiently absorbs the microwave energy. The vaporized zinc, lead and trace amounts of other heavy metals 78 exit a flue and pass through a cooler 80 where they condense out of the air. The condensed metals are passed to a bag house 82 for collection. A fan 84 is used to pull the condensed metals into the bag house 82. Note that the zinc oxidizes when it hits the air in the cooler 80.

The residue 86 of the microwave kiln 76 may be placed in a cooler 88 and the waste heat 72 extracted for use in the pre-heater 70 or to sweep the vaporized metals in the microwave kiln 76 or both. The cooled residue may then be transported to a cement processing plant. In another embodiment, the residue 86 which is mainly iron oxide dust is placed in pug mill 90. The pug mill 90 forms briquettes from the iron oxide that may be reused in the steel making process. In an alternative embodiment, the iron rich slag residue 86 exits the microwave kiln 76 and is further processed by an induction heating furnace or is added with carbon and heated to form ingots.

Figure 3:
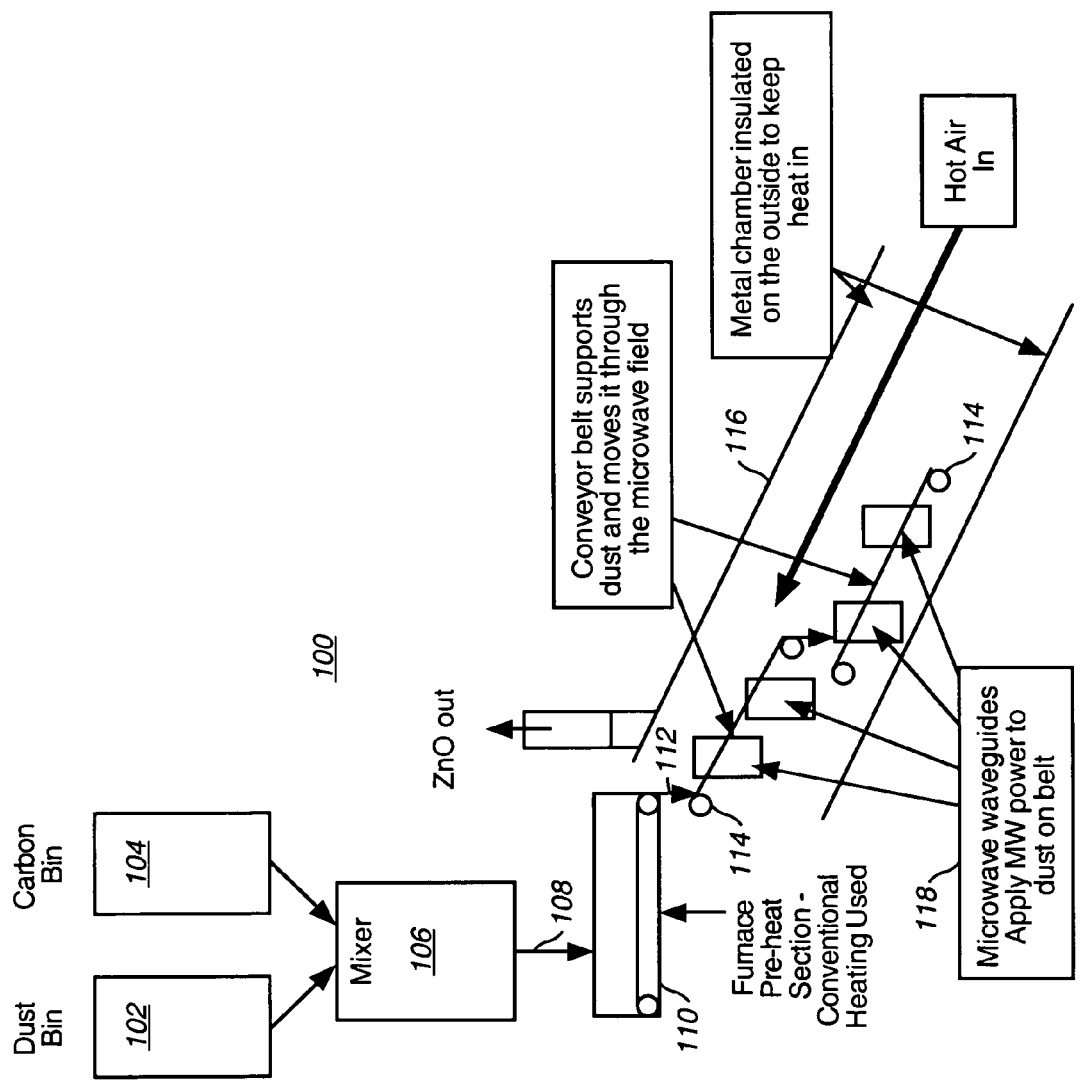
FIG. 3 is a partial block diagram of a system for processing electric arc furnace dust in accordance with one embodiment of the invention.

FIG. 3 is a partial block diagram of a system 100 for processing electric arc furnace dust in accordance with one embodiment of the invention. The system 100 has a dust bin 102 and a carbon bin 104 that feed a mixer 106. The mixer 106 feeds the mixed dust 108 to a pre-heat section 110. The preheated dust 112 is then placed on a conveyor 114 in a microwave kiln 116. A number of microwave waveguides 118 are strategically placed along the conveyor(s) 114. The microwaves are applied in the tunnel of the kiln 116 from the sides of the cavity. This lessens the chance that the liberated zinc oxide will form on the microwave windows and cause selective heating damaging the microwave windows. The microwave generators emit at standard industrial microwave frequencies of 2.45 GHz and 922 MHz or 915 MHz. While the power outputs of these microwave generators may vary they are commonly between 75 KW to 100 KW of continuous microwave power.

The waveguide of microwave launching sections 118 are oriented on an angle so that the propagation of the energy is targeted at the beginning of the dust bed on the side of the conveyer spanning the middle of the dust bed on the conveyor. This ensures that the highest energy fields are contracting the dust bed from its side to the middle. The microwave energy not absorbed in the dust bed propagates through the multimode cavity and couples into other areas of the dust bed providing a heating affect outside the high-density field.

Microwave generators are placed on either side of the enclosure or cavity, but not placed as so they are directly opposite of each other. Typically they are staggered along the length of the enclosure by a few inches or more to prevent coupling into the opposite microwave device.

In another embodiment the microwave waveguides are positioned so that the high intensity microwave field spans the dust bed from one side of the dust bed to the other. In this case the bed width is reduced to keep both sides of the dust bed within the high intensity microwave field.

The microwave conveyor belts may be made of a flexible high temperature metal that supports and carries the dust bed or may be made of a flexible high temperature material that is transparent to microwave energy. The transparent material allows microwave energy to penetrate into the dust bed from the bottom of the belt.

Figure 4:
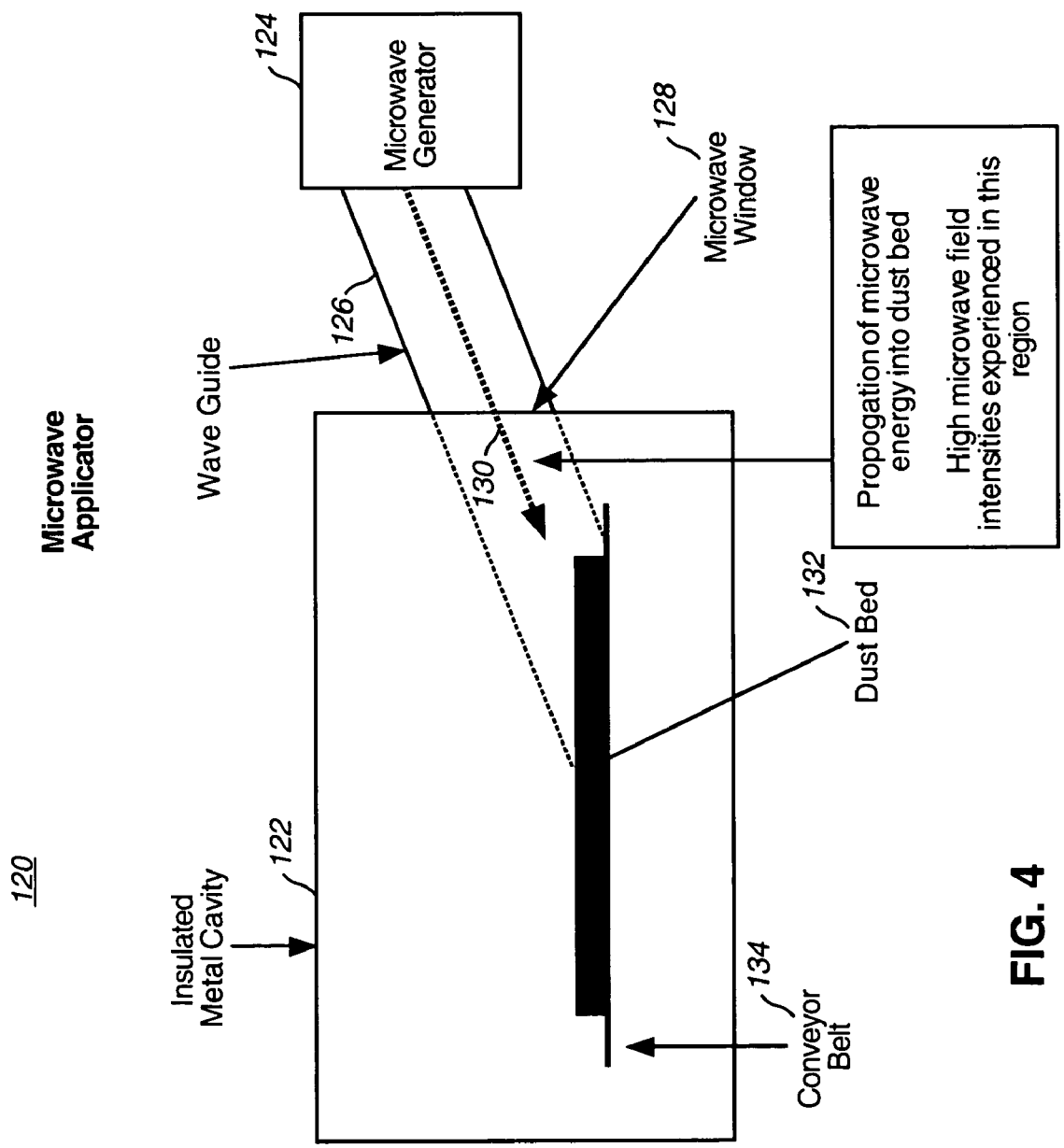
FIG. 4 is a schematic view of a microwave kiln in accordance with one embodiment of the invention.

FIG. 4 is a schematic view of a microwave kiln 120 in accordance with one embodiment of the invention. The microwave kiln 120 has an insulated metal cavity 122. The metal cavity 122 makes a multimode cavity for the microwaves and the insulation reduces the amount of heat lost. A microwave generator 124 is attached to a waveguide 126. A microwave window 128 on the side of the insulated metal cavity 122 allows the microwave energy 130 to enter the cavity 122 and impinge upon the dust bed 132. The dust bed 132 rides on a conveyor belt 134.

Figure 5:
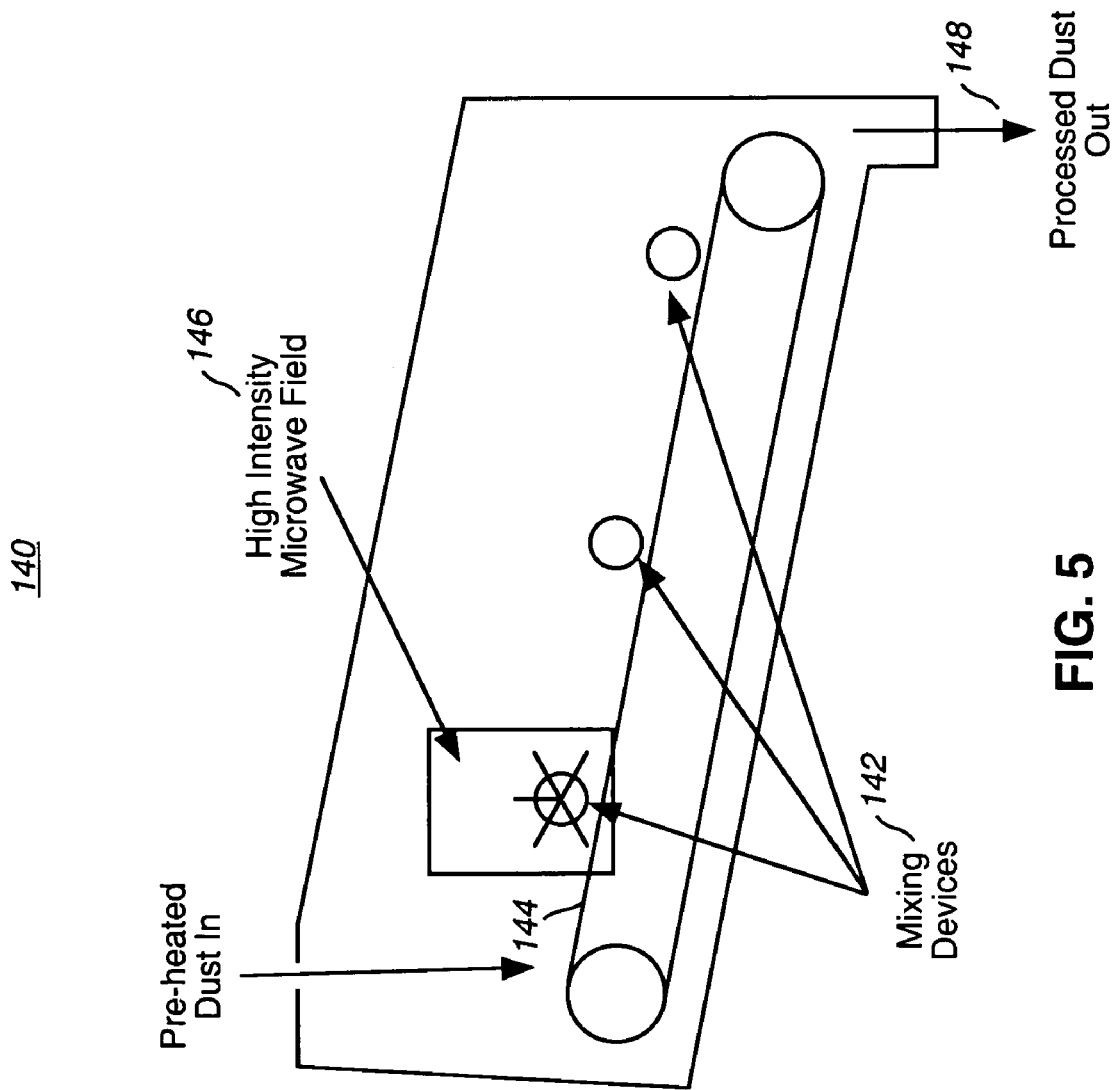
FIG. 5 is a schematic view of a microwave kiln in accordance with one embodiment of the invention.

FIG. 5 is a schematic view of a microwave kiln 140 in accordance with one embodiment of the invention. In this embodiment of the kiln 140, mixing devices 142 are placed along the conveyor belt 144 to allow the carbon in the mixture to interact with the oxygen in the air. The microwave energy 146 is then applied to the mixture while it is off the conveyor belt 144. The processed dust or residue 148 exits at the end of the conveyor belt 144.

Figure 6:
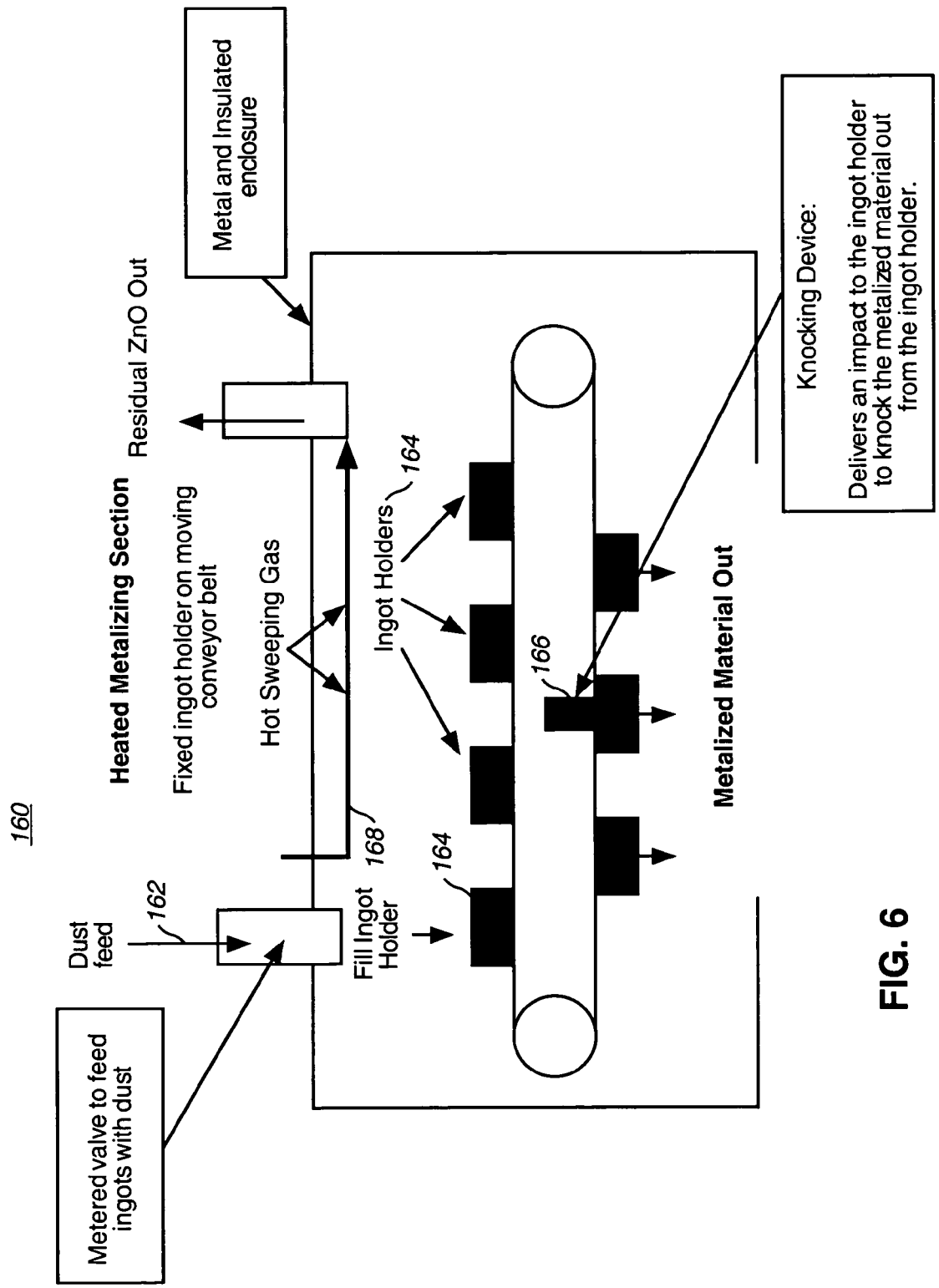
FIG. 6 is a schematic diagram of an ingot forming process in accordance with one embodiment of the invention.

FIG. 6 is a schematic diagram of an ingot forming process 160 in accordance with one embodiment of the invention. The input is the iron rich residue 162 of processed dust and carbon. The residue is placed in an ingot holder 164. The ingot holders 164 are heated to a temperature that may exceed 1300 C. This allows the dust to become molten. The ingot is then cooled and a knock out device 166 pushes the ingots out of the holders. Hot sweeping gas 168 is used to capture any residual zinc oxide or other metal vapors. The dust may be heated with conventional gas heating or microwaves or a combination of both.

Figure 7:
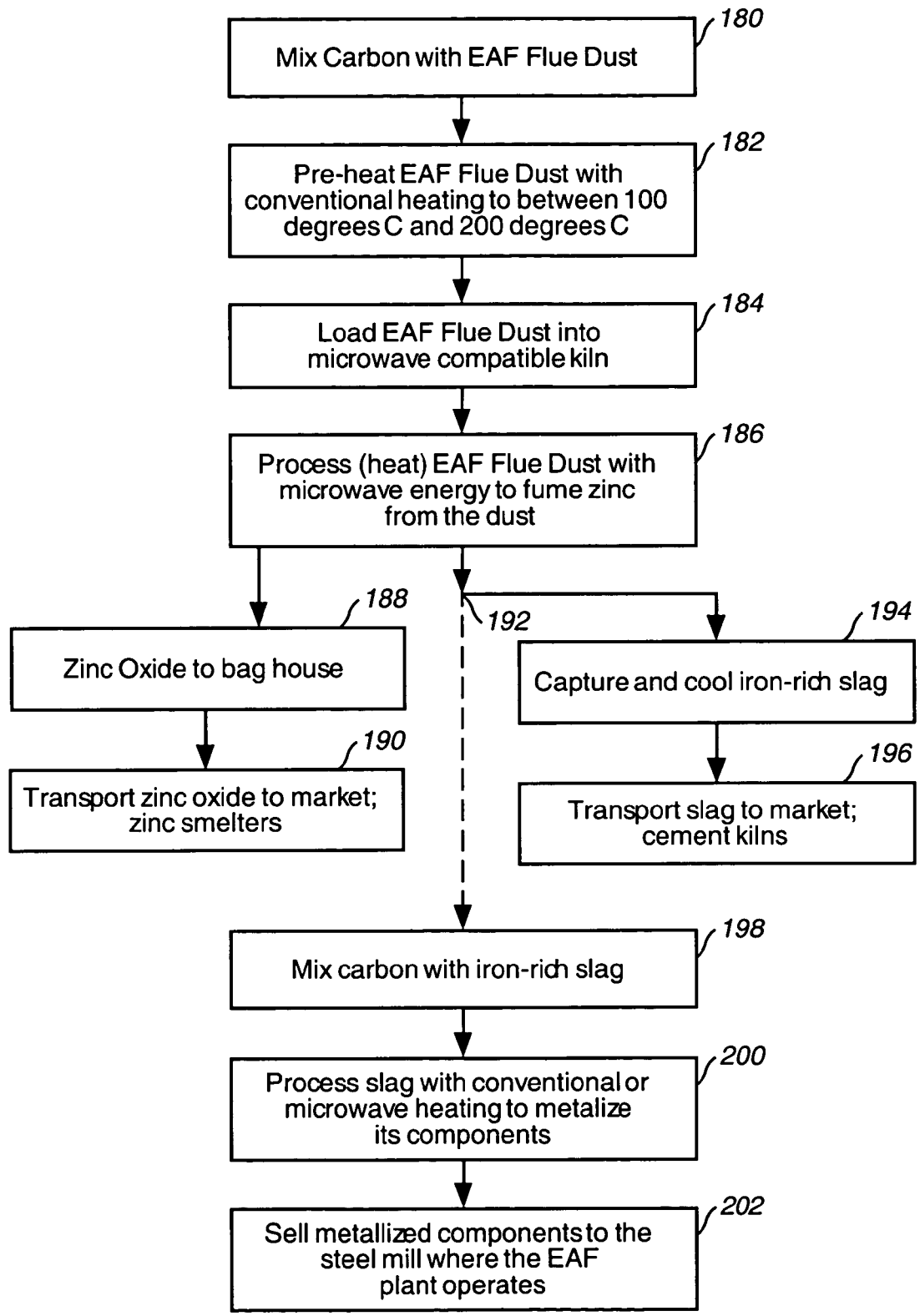
FIG. 7 is a flow chart of the steps used in a method of processing electric art furnace dust in accordance with one embodiment of the invention.

FIG. 7 is a flow chart of the steps used in a method of processing electric art furnace dust in accordance with one embodiment of the invention. The process starts by mixing carbon with EAF (electric arc furnace) dust at step 180. The mixture is heated to a temperature between 100 C and 200 C using conventional heating at step 182. The pre-heated dust is then placed in a microwave compatible kiln at step 184. Microwave energy is applied to the pre-heated dust to fume zinc from the dust at step 186. The zinc is cooled and oxidizes and the zinc oxide is collected in a bag house at step 188. The zinc oxide is transported to a zinc smelter at step 190. The residue 192 may be processed in one of two alternative manners. In the first case the iron rich slag is cooled at step 194. The slag is transported to a cement kiln at step 196. In the other case the iron rich slag is mixed with carbon at step 198. The slag is then heated by convection or microwave energy to metalize it components at step 200. The metalized components are then used in a steel mill at step 202.

Figure 8:
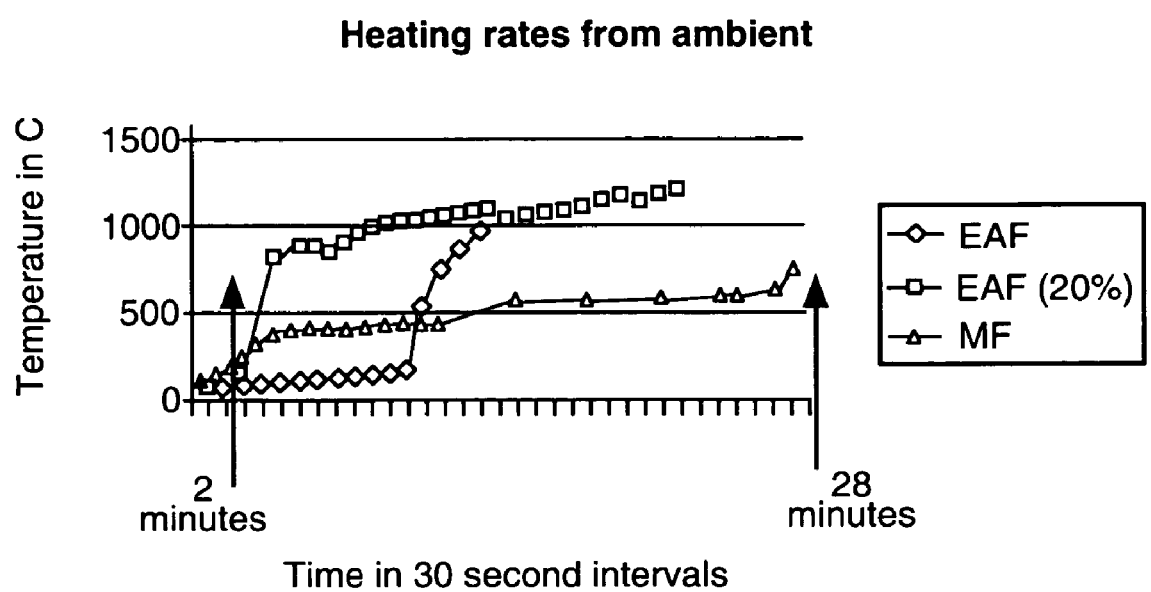
FIG. 8 is a graph of the temperature versus time for electric arc furnace dust for different heating scenarios.

FIG. 8 is a graph of the temperature versus time for electric arc furnace dust for different heating scenarios. The curve labeled (EAF) shows the heating rate for EAF dust without carbon. Note that it takes about six minutes for the EAF dust to really start heating up. After six minutes the EAF dust quickly reaches 1000 C. The curve labeled EAF (20%) is EAF dust mixed with carbon and heated by microwaves. Note that this mixture reaches a 1000 C much faster than the EAF dust alone. Both curves show that the EAF dust starts to heats up very fast once it hits around 200 C. This is the reason for the pre-heating section of the system. The third curve labeled MF shows the heating of EAF dust with conventional heating having the similar power as the microwave heating. Note that the mixture has not even reached 1000 C after twenty eight minutes. These curves show that microwave heating is an extremely efficient method of heating the EAF dust.

Figure 9:
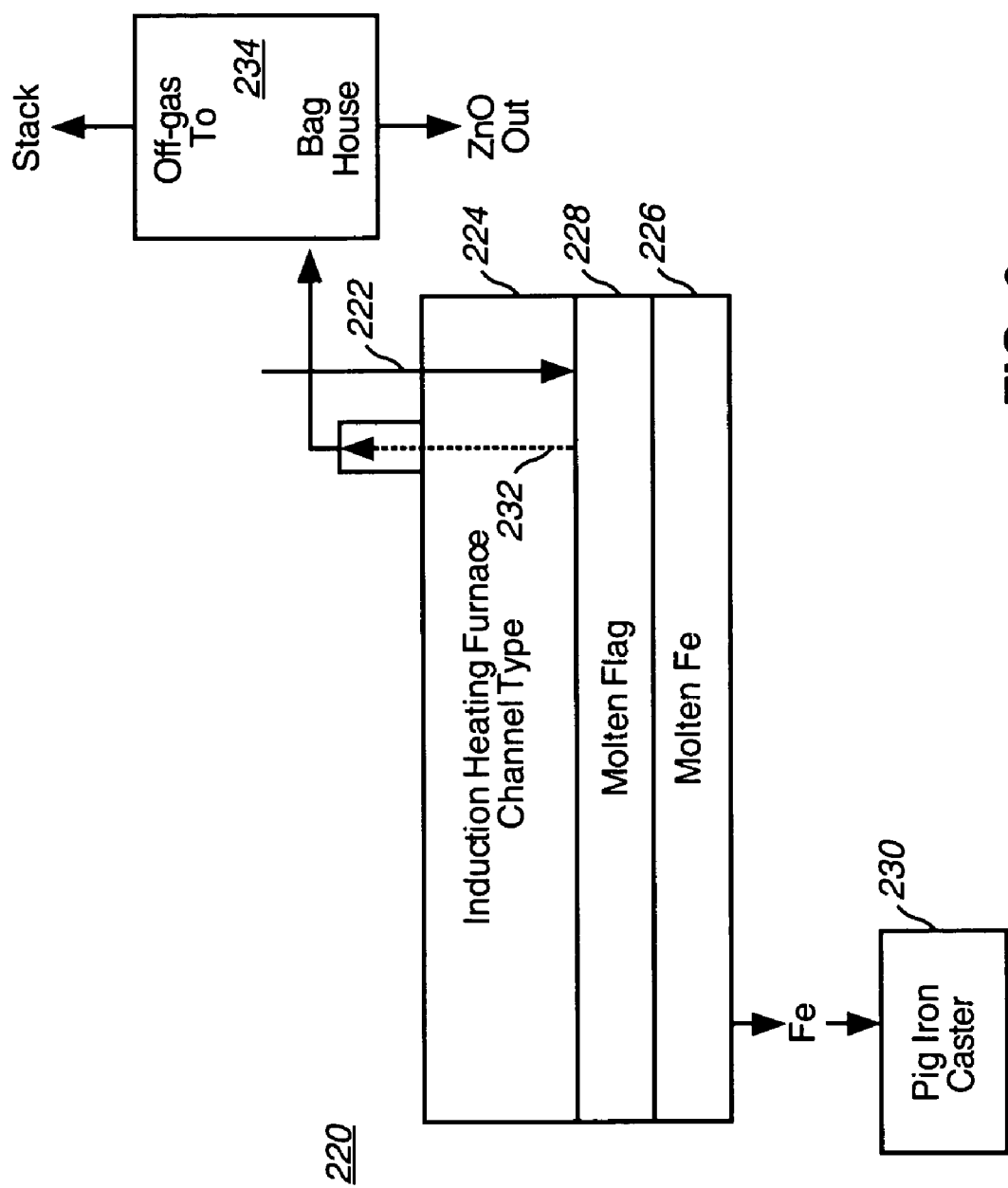
FIG. 9 is an induction heating process in accordance with one embodiment of the invention.

FIG. 9 is an induction heating process 220 in accordance with one embodiment of the invention. The iron rich slag residue 222 from the microwave kiln is placed in an induction heating furnace 224 along with additional carbon and silica. The induction heating furnace allows the molten iron 226 to separate from the molten slag 228. The molten iron 226 is periodically drawn off to a pig iron caster 230. The molten slag 228 is periodically drawn off, cooled and then used in construction applications. Any metal vapors 232 from the process are collected by a bag house 234.

The use of a microwave kiln that heats faster and has a residue that is easy to handle allows the system described herein to be much smaller than a Waelz kiln and still be economically viable. As a result, the system described herein may be collocated with the steel plant producing the EAF dust. This eliminates the transportation costs.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of processing electric arc furnace dust, comprising the steps of:
    a) preheating a portion of electric arc furnace dust to a temperature of at least 170 degrees centigrade by convection heating to form a preheated dust;
    b) heating the preheated dust by microwave until a zinc in the preheat dust vaporizes to form a metal vapor and a residue; and
    c) condensing the metal vapor, wherein step (a) further includes the stw of: a1) determining a percentage of zinc in the portion of electric arc furnace dust a2) mixing the portion of electric arc furnace dust with a quantity of carbon, wherein the quantity of carbon is determined by the percentage of zinc.

2. The method of claim 1, further including the steps of:
    d) removing the residue from the microwave;
    e) heating the residue to form a molten material.

3. The method of claim 2, further including the step of:
    f) induction hearing the residue.

4. The method of claim 1, wherein the quantity of carbon is proportional to the percentage of zinc.

5. The method of claim 1, wherein step (b) further includes the step of:
    b1) limiting a bulk temperature of the preheated dust to less than 1200 degrees centigrade.

6. The method of claim 1, wherein step (b) further includes the step of:
    b1) sweeping a metal vapor from the preheated dust using a hot air.

7. A system for processing electric arc furnace dust, comprising:

a convection preheating section;
a microwave kiln receiving a preheated dust from the convection preheating section;
a condensation and collection section coupled to a flue of the microwave kiln; and an ingot forming process coupled to the microwave kiln.

8. The system of claim 7, further including a pug mill that processes a residue of the microwave kiln.

9. The system of claim 7, further including a dust mixer that mixes a portion of electric arc furnace dust with a predetermined percentage of carbon.

10. The system of claim 9, further including a system for determining a percentage of zinc in the portion of electric arc furnace dust.

11. The system of claim 10, wherein the dust mixer has an algorithm for determining the predetermined percentage of carbon based on the percentage of zinc in the portion of electric arc furnace dust.

12. The system of claim 7, wherein the microwave kiln has a temperature sensor and a variable conveyance system coupled to a controller.

13. A system for processing electric arc furnace dust, comprising:

a convection preheating oven having a preheating temperature sensor;
a microwave kiln receiving a preheated dust and having a flue and a temperature sensor;
a collector receiving fumes from the flue of the microwave kiln; and an ingot forming process coupled to the microwave kiln.

14. The system of claim 13, further including a mixer that mixes an electric arc furnace dust with carbon only to form a mixture that is provided to the convection preheating oven.

15. The system of claim 13, further including a pug mill that receives a residue from the microwave kiln.

16. The system of claim 13, wherein the preheating temperature sensor is coupled to a preheating controller that controls a preheating variable rate conveyance system in the convention preheating oven.

17. The system of claim 13, wherein the temperature sensor is coupled to a controller that control a variable rate conveyance system in the microwave kiln.

18. The system of claim 17, wherein the conveyance system mixes the preheated dust with air.

\* \* \* \* \*

UNITED STATES PATENT AND TRADEMARK OFFICE
CERTIFICATE OF CORRECTION

| | | |
|---|---|---|
| PATENT NO. | : 7,227,882 B2 | |
| APPLICATION NO. | : 10/950260 | |
| DATED | : June 5, 2007 | |
| INVENTOR(S) | : Frederick A. Schaefer | |

It is certified that error appears in the above-identified patent and that said Letters Patent is hereby corrected as shown below:

Col. 6, in Claim 1, line 45 please delete "stw" and insert --step--.

Signed and Sealed this

Seventh Day of August, 2007

JON W. DUDAS
*Director of the United States Patent and Trademark Office*